(12) United States Patent
Huang et al.

(10) Patent No.: US 8,885,280 B1
(45) Date of Patent: Nov. 11, 2014

(54) POLARIZATION ROTATOR

(71) Applicant: Seagate Technology LLC, Cupertino, CA (US)

(72) Inventors: Xiaoyue Huang, Eden Prairie, MN (US); Karim Tatah, Eden Prairie, MN (US); Ziyou Zhou, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/908,693

(22) Filed: Jun. 3, 2013

(51) Int. Cl.
*G11B 7/00* (2006.01)

(52) U.S. Cl.
USPC .......................................... 360/59

(58) Field of Classification Search
USPC ............. 360/59, 75; 369/13.33, 13.24, 119, 369/112.23, 44.14
See application file for complete search history.

(56) References Cited

U.S. PATENT DOCUMENTS

| | | | | |
|---|---|---|---|---|
| 5,889,641 | A | * | 3/1999 | Belser et al. .................. 360/313 |
| 6,798,729 | B1 | * | 9/2004 | Hurst et al. .................... 369/119 |
| 7,898,759 | B2 | * | 3/2011 | Matsumoto et al. ............ 360/59 |
| 2008/0117727 | A1 | * | 5/2008 | Matsumoto ................ 369/44.14 |
| 2011/0090587 | A1 | * | 4/2011 | Chou et al. ....................... 360/59 |
| 2011/0199867 | A1 | * | 8/2011 | Stipe ........................... 369/13.24 |

FOREIGN PATENT DOCUMENTS

EP 0685081 A1 12/1995

OTHER PUBLICATIONS

Khartsev et al., "High performance latching-type luminescent magneto-optical photonic crystals", Optics Letters /vol. 36, No. 15 / Aug. 1, 2011, pp. 2806-2808.

\* cited by examiner

*Primary Examiner* — Nabil Hindi
(74) *Attorney, Agent, or Firm* — HolzerIPLaw, PC

(57) ABSTRACT

Implementations disclosed herein allow a magneto-optical polarization rotator to couple light from a light source of a HAMR recording device to waveguide attached to a slider. According to one implementation, the magneto-optical polarization rotator has a magnetophotonic crystal structure with a number of thin film layers configured to rotate the light by 90 degrees.

20 Claims, 7 Drawing Sheets

POLARIZATION ROTATOR

BACKGROUND

Heat assisted magnetic recording (HAMR) generally refers to the concept of locally heating a recording medium to reduce the coercivity of the medium. This allows an applied magnetic field to more easily direct the magnetization of a data bit on the medium during a temporary magnetic softening caused by the heat source. HAMR allows for the use of small grain media with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the coercivity of the media is reduced such that the magnetic write field is sufficient to write to the media. Once the media cools to a normal operating temperature, the coercivity has a sufficiently high value to assure thermal stability of the recorded information. Better designs are needed to increase efficiency, alignment, precision, and reduced size of the local heating.

SUMMARY

Implementations described and claimed herein provide for a magneto-optical polarization rotator that couples light from a light source of a HAMR device to a waveguide attached to a slider. These and various other features and advantages will be apparent from a reading of the following detailed description.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

DETAILED DESCRIPTION

Figure 1:
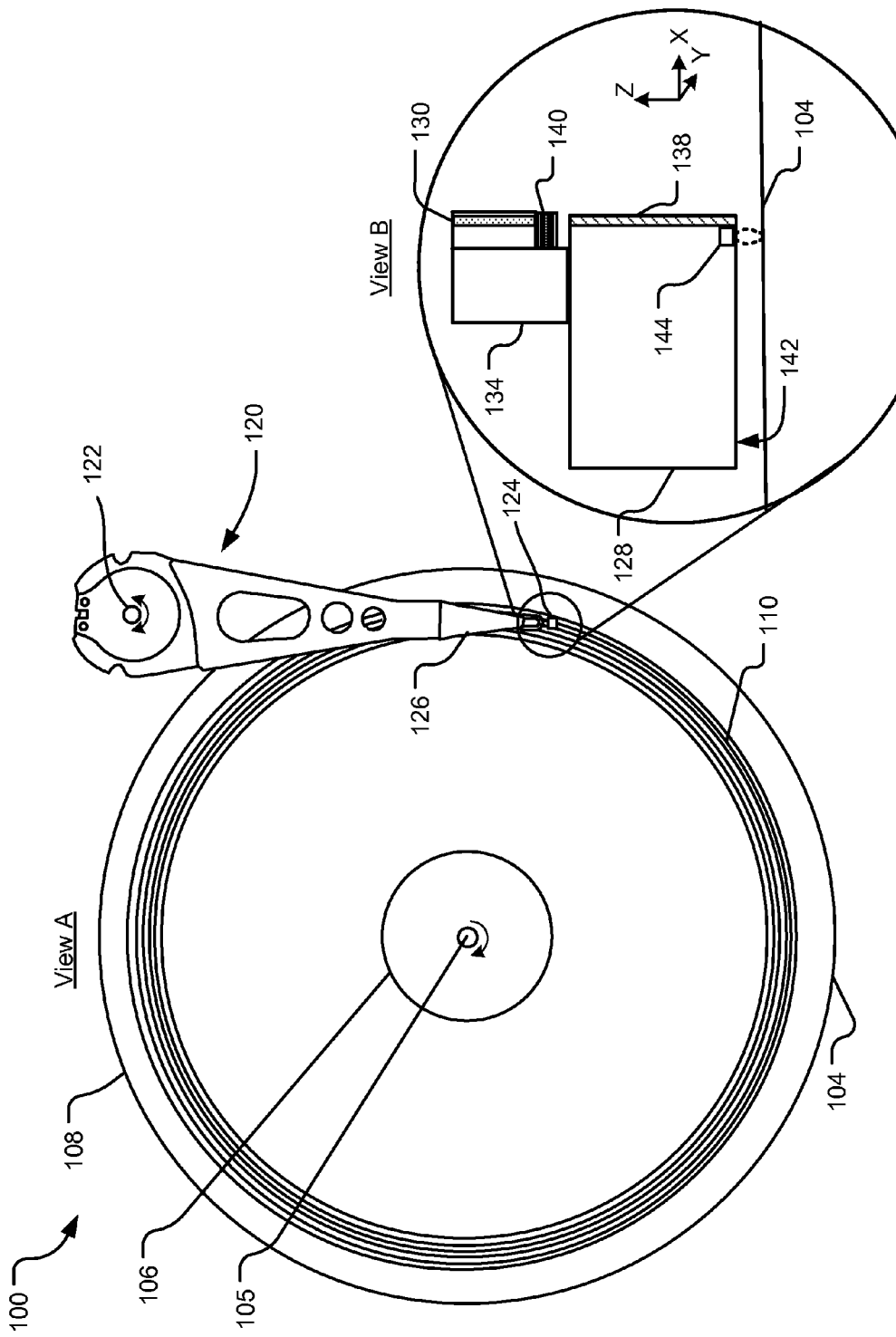
FIG. 1 illustrates a data storage device having an example transducer head assembly.

For heat assisted magnetic recording (HAMR), an electromagnetic light wave (e.g., visible, infrared, or ultraviolet light) can be directed from the air-bearing surface (ABS) of a recording head onto a surface of a data storage medium to raise the temperature of a localized area and facilitate switching of the polarity of a data bit. In developing HAMR recording heads, one difficulty has been developing a technique for transmitting sufficient light energy into the storage medium to heat it by several hundred degrees in a localized area where the recording occurs. If the optical spot is larger than this area, it will extend to neighboring bits and tracks on the disc, heat those areas as well, and the data recorded in those areas may be corrupted. Confining the optical spot to an area much smaller than a wavelength of light, and well below the so-called "diffraction limit" that can be achieved by standard focusing lenses, is an area of study called "near field optics" or "near field microscopy."

Optical waveguides such as solid immersion lenses (SILs), solid immersion mirrors (SIMs), and mode index lenses may be used in near field optics to reduce the size of a spot on the medium that is subjected to the electromagnetic radiation. However, SILs, SIMs, and mode index lenses alone may be insufficient to achieve sufficiently small focal spot sizes for high areal density recording due to diffraction limited optical effects. Metal pins and other near field transducer (NFT) designs positioned at the focal point of a waveguide are used to further concentrate the energy and direct it to a small spot on the surface of the recording medium.

Some Heat Assisted Magnetic Recording (HAMR) devices use Transverse Electric (TE) mode laser beams in conjunction with TE mode driven NFTs. Other functional HAMR devices use Transverse Magnetic (TM) mode laser beams in conjunction with TM mode driven NFTs. However, TM and TE mode lasers are not typically available in equal supply. Therefore, a mechanism to use TM and TE mode lasers interchangeably with either TM or TE mode driven NFTs could speed manufacturing capabilities and lower production costs.

A polarization rotator can be used to transform TM light to TE light or TE light to TM light. However, one primary concern in manufacturing polarization rotators for HAMR devices is size. As linear recording density increases, there is a demand to create smaller and smaller HAMR recording heads. To implement a conventional mode-based waveguide rotator in a HAMR device, the travel distance required for the polarization of HAMR wavelength light (~830 nm) may be 100 microns or more. However, this large travel distance is incompatible with increasing consumer demands for smaller storage devices with greater recording densities.

Implementations disclosed herein provide for a magneto-optical polarization rotator that polarizes light by approximately 90 degrees to allow for the interchangeability of TM and TE mode based devices in HAMR recording heads. According to one implementation, the magneto-optical polarization rotator performs such polarization over a total light travel distance of less than 10 microns. While implementations disclosed herein are specifically directed to HAMR technology, similar methods and systems may be applied to other recording technologies.

FIG. 1 illustrates a data storage device 100 having an example transducer head assembly 124. View A illustrates a storage medium 104 (e.g., a magnetic data storage disk) on which data bits can be recorded using a magnetic write pole and from which data bits can be read using a magnetoresistive element. The storage medium 104 rotates about a spindle center or a disc axis of rotation 105 and includes an inner diameter 106 and an outer diameter 108 between which are a number of concentric data tracks (e.g., a data track 110). In additional to the storage device 100, the described technology can also be used with a variety of storage formats, including continuous magnetic media, discrete track (DT) media, shingled media, etc.

Information may be written to and read from data bit locations in the data tracks on the storage medium 104. The transducer head assembly 124 is mounted on an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

In an implementation employing HAMR, the recording action is assisted by a heat source applied to a bit location on the storage medium 104 having a very high magnetic anisotropy, which contributes to thermal stability of the magnetization of the small magnetic grains in the storage medium 104. By temporarily heating the storage medium 104 during the recording process, the magnetic coercivity of the magnetic grains can be selectively lowered below an applied magnetic write field in a tightly focused area of the storage medium 104 that substantially corresponds to an individual data bit. The heated region is then encoded with the recorded data bit based on the polarity of the applied magnetic write field. After cooling, the magnetic coercivity substantially returns to its pre-heating level, thereby stabilizing the magnetization for that bit. This write process is repeated for multiple data bits on the storage medium, and such data bits can be read using a magnetoresistive read head.

Referring to View B, the transducer head assembly 124 includes, among other features, an NFT 144, a waveguide 138, a slider 128, a light source 130 (e.g., a laser), a submount 134, and a polarization rotator apparatus 140. An air-bearing surface 142 of the slider 128 "flies" across the surface of the storage medium 104, reading and writing data bits from and to the magnetic grains in the surface of the storage medium 104.

The light source 130 directs light into the polarization rotator apparatus 140. There are various methods of launching light into the polarization rotator apparatus 140. In the implementation shown, a front facet of the light source 130 is coupled directly to a receiving end of the polarization rotator apparatus 140. The light source 130 directs light through the polarization rotator apparatus 140, which polarizes the light by an angle of approximately 90 degrees. The light is then directed through the waveguide 138 and focused, via the NFT 144, onto a spot on the storage medium 104 as the medium 104 rotates below the transducer head assembly 124. In at least one implementation, the polarization rotator apparatus 140 is a magnetophotonic crystal structure including layers of thin dielectric and/or magnetic films. This magnetophotonic crystal structure may have a total thickness (z-direction thickness between the light source 130 and slider 128) of approximately 5-10 microns.

Figure 2:
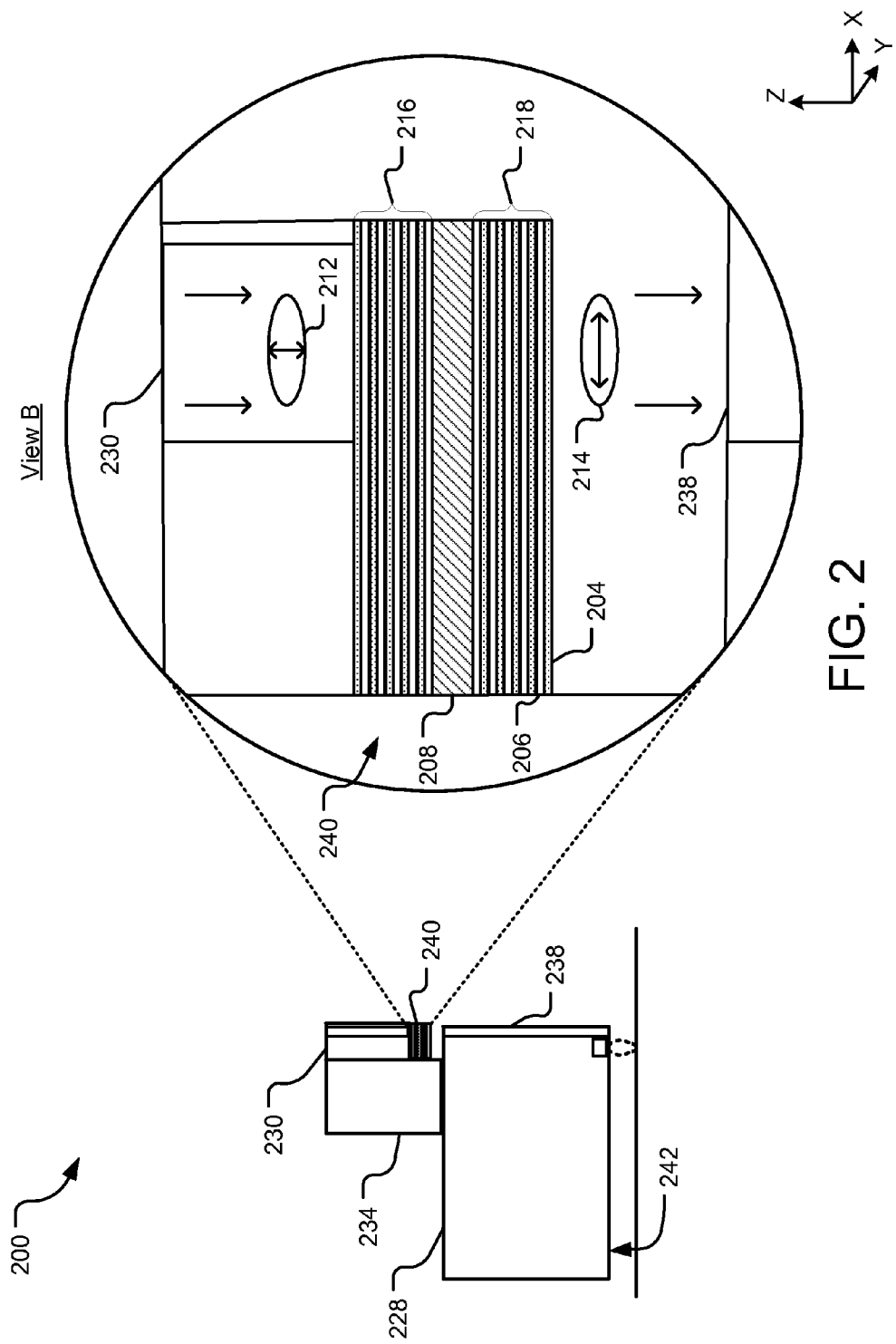
FIG. 2 illustrates a HAMR recording head having a slider, a submount, a waveguide, a light source, and an example magneto-optical polarization rotator.

FIG. 2 illustrates a HAMR recording head 200 having a slider 228, a submount 234, a waveguide 238, a light source 230, and an example magneto-optical polarization rotator 240. The magneto-optical polarization rotator 240 is shown in more detail in View B.

The magneto-optical polarization rotator 240 is a laminated magnetophotonic crystal structure including a number of substantially planar (e.g., within 2 degrees of planar), alternating thin film layers of magnetic optical materials (e.g., garnets). In the magneto-optical polarization 240, even layers (e.g., an example even layer 206) of thin film material with a low refractive index are interleaved between odd layers (e.g., an example odd layer 204) of a thin film material having a high refractive index. In another implementation, the positioning of the low and high refractive layers is inverted such that the even layers have a high refractive index and the odd layers have a low refractive index. In one implementation, the even layers have a refractive index of approximately 2.5, and the odd layers have a refractive index of approximately 1.96.

The interleaved thin film layers of high and low refractive indices (i.e., the "alternating thin film layers") form a Bragg Reflector with a photonic bandgap that allows for the transmission of HAMR wavelength light (e.g., light of approximately 830 nm). According to one implementation, the photonic bandgap of the polarization rotator 240 has a transmission peak at the wavelength of HAMR light (e.g., approximately 830 nm) to allow for enhanced polarization rotation of HAMR laser light at the resonant peak. In the same or another implementation, the photonic bandgap permits the transmission of light wavelengths between about plus or minus 10 nanometers on either side of the resonant peak.

The magneto-optical polarization rotator 240 also includes a phase shift region 208 sandwiched between two stacks 216 and 218 of the alternating thin film layers. The phase shift region 208 is made of a magnetic material and provides a strong magneto-optical effect that rotates incident light by approximately one-quarter wavelength. Suitable material choices for the phase shift region 208 include without limitation bismuth, erbium, and aluminum-doped FeGaxOy.

The alternating thin film layers in the stacks 216 and 218 on opposite sides of the phase shift region 208 may be dielectric or magnetic. Each of the odd layers may be of the same or a different composition from the other odd layers. Similarly, each of the even layers may be of the same or a different composition from other even layers. In one implementation, the alternating thin film layers are alternating layers alumina and silicon dioxide. In another implementation, magnetic iron garnets are used in the structure. In the same or another implementation, magnetic iron garnet layers are interleaved between non-magnetic layers of $Sm_3Ga_5O_{12}$ or $Gd_3Ga_5O_{12(111)}$, which can help the garnets to maintain better crystallinity. In yet another implementation, the alternating thin film layers are layers of $Bi_{2.97}Er_{0.03}Fe_4Al_{0.5}Ga_{0.5}O_{12}$ (hereinafter "BiG") and $Sm_3Ga_5O_{12}$ (hereinafter "SGG").

The number of layers included in each of the alternating thin film layer stacks 216 and 218 may vary in different implementations. However, in some implementations, each of the stacks 216 and 218 include between five and twenty periods of the alternating thin film layers, where a "period" includes one of the layers of the lower refractive index material and one of the layers of a higher refractive index material.

Each of the individual thin film layers in the stacks 216 and 218 may have a thickness (z-direction) given by:

$$\frac{\lambda_{peak}}{4n} \quad (1)$$

where $\lambda_{peak}$ is the resonant peak wavelength of light from the laser 230 and n is the refractive index of the material of the individual thin film layer. According to on implementation, the phase shift region 208 has a thickness (z-direction) that is approximately equal to 2k (where k is an integer 1, 2, 3, . . . ) multiplied by the result of equation 1, above.

The total thickness (e.g., z-direction thickness) of the polarization rotator 240 may be less than or equal to 10 microns. In one example implementation, there are 10 periods of alternating thin film BiG and SGG layers on either side of a BiG phase shift region 208 and the total thickness (z-direction) of the polarization rotator is about 4.6 microns.

The length (x-direction) and width (y-direction) may vary according to desired design criteria. However, in one implementation the length and width are both greater than or substantially equal to five microns.

In operation, light from a laser 230 or other light source mounted on the submount 234 of a HAMR recording head 202 is directed through the polarization rotator 240 toward an ABS 242 above a rotating magnetic medium below. The incoming light from the laser 230 may be TE or TM mode light. For example, in an implementation where a TM mode laser is used, the arrow 212 may indicate the direction of the electric field of light (i.e., TM light) incident on the polarization rotator 200. When the light passes through the polarization rotator 200, it is polarized by approximately 90 degrees. Thus, the arrow 214 may indicate the direction of the electric field of the light (i.e., now TE light) exiting the polarization rotator as it moves toward the ABS. In another implementation, arrows 212 and 214 indicate the direction of the magnetic field of the light before and after the light passes through the polarization rotator 240.

Figure 3:
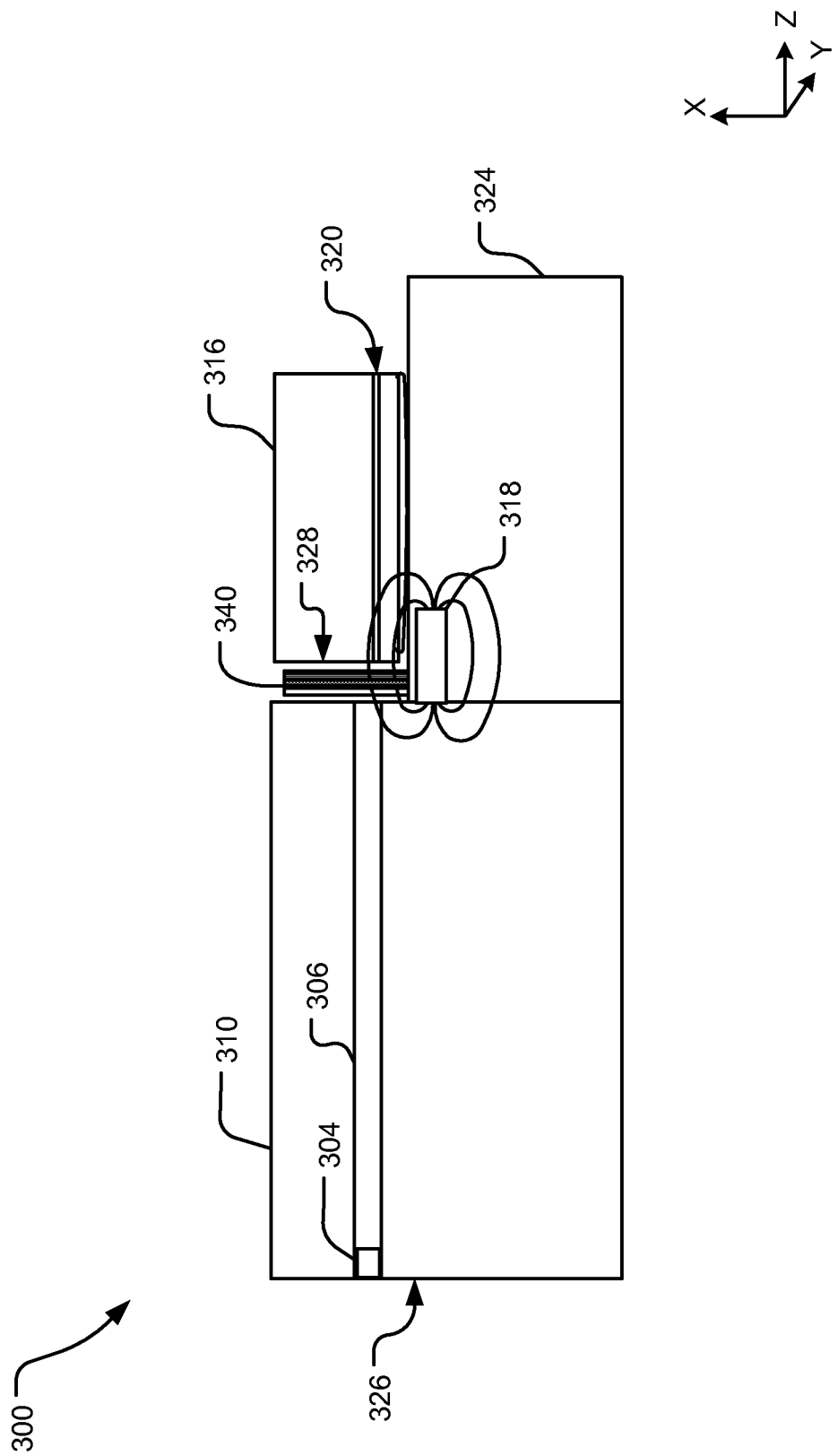
FIG. 3 illustrates a HAMR recording head having an example polarization rotator mounted to a submount of the HAMR recording head.

FIG. 3 illustrates an example implementation of a polarization rotator 340 mounted to a submount 324 of HAMR recording head 300. The HAMR recording head 300 includes a laser 316 mounted to a submount 324. The laser 316 is configured to emit a light beam that travels along a laser active region 320, through the polarization rotator 340 and through a waveguide 306 toward an ABS 326. The ABS 326 is approximately perpendicular to the longitudinal axis of the waveguide 306 and proximal to a rotating storage medium (not shown). The submount 324 is mounted to a slider 310 to which the waveguide 306 is mounted. The waveguide 306 is oriented substantially perpendicular to the ABS 326; however, in other implementations the waveguide 306 may be angled with respect to the ABS 326. As used herein, the term "substantially" used with reference to a direction (e.g., substantially perpendicular or substantially parallel) shall mean within two degrees of that direction.

The HAMR recording head 300 further includes an NFT 304 attached to the slider 310 near the base of the waveguide 306 and proximal to the ABS 326. The waveguide 306 is sized and shaped to receive and direct light from the laser 320 along the inside of the waveguide 306 to a focal point at the NFT 304. The NFT 304 further concentrates the energy of the light and directs it to a small spot on the surface of the rotating storage medium.

The polarization rotator 340 may be the same or similar to the polarization rotator described above with respect to FIGS. 1-2. In particular, the polarization rotator 340 includes a plurality of thin film layers and is mounted to a surface of the submount 324 at a position between the laser 316 and the slider 310. The polarization rotator 340 is bonded to the submount 324 via solder or another attachment mechanism such that the thin film layers are substantially parallel to the ABS 326 and substantially parallel to the rotating storage media. In FIG. 3, the polarization rotator 340 does not contact either the laser 316 or the slider 310. However, in other implementations, the polarization rotator 340 may be mounted to the submount (e.g., as illustrated in FIG. 3) and also contact one or both of the laser 316 and the slider 310.

A magnet 318 is attached to the submount 324 and positioned such that the magnetic flux lines of the magnet 318 are in the direction of light propagation through the polarization rotator 340. The magnet 318 functions to align the magnetization direction of a phase shift region in the polarization rotator 340 (e.g., the phase shift region 208 illustrated in FIG. 2) in the direction of light propagation so as to enable a sufficient magneto-optical effect that rotates the polarization of the light. However, the magnet 318 may not be included in implementations where the material of the phase shift region (e.g., the phase shift region 208 in FIG. 2) has a magnetic orientation that latches (e.g., during growth of the polarization rotator 340) perpendicular to the layers of thin film in the polarization rotator 340.

The polarization rotator 340 may be grown on semi-conductor wafer by any of a number of standard deposition methods including without limitation: sputtering, atomic layer deposition (ALD), evaporation, ion beam deposition (IBD). After such deposition processes, the wafer substrate may be diced into individual components (e.g., a number of individual polarization rotators the same or similar to the polarization rotator 340).

The polarization rotator 340 is bonded, via solder or other attachment mechanism, to the submount 324 adjacent a light emitting surface 328 of the laser 316 such that the thin film layers of the polarization rotator 340 are substantially perpendicular to a direction of light propagation along the laser active region 320.

One advantage to bonding the polarization rotator 340 to the HAMR recording head 300 in the manner of FIG. 3 (e.g., after manufacturing of the polarization rotator 340) is that the polarization rotator 340 is not, during manufacturing, restricted by the temperature-related constraints of the slider 310 and/or submount 324.

Figure 4:
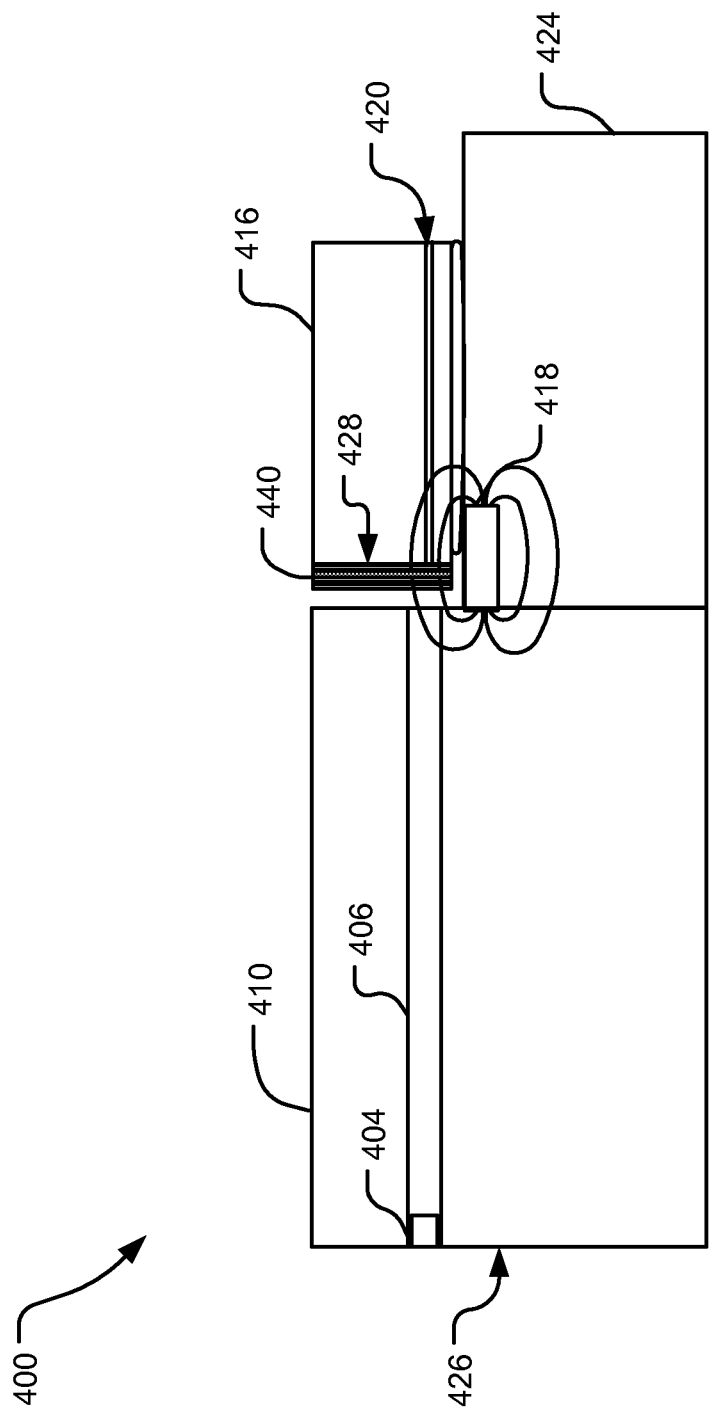
FIG. 4 illustrates a HAMR recording head having an example polarization rotator attached to a front facet of a laser.

FIG. 4 illustrates a HAMR recording head 400 having an example polarization rotator 440 attached to a front facet of a laser 416. The laser 416 of the HAMR recording head 400 is mounted to a submount 424 and configured to emit a light beam that travels along a laser active region 420 and through the polarization rotator 440 toward an ABS 426 proximate to a rotating storage medium (not shown). The submount 424 is attached to a slider 410 that includes a waveguide 406 oriented substantially perpendicular to the ABS 426. The HAMR recording head 400 also includes an NFT 404 attached to the slider 410 near the base of the waveguide 406, proximal to the ABS 426. The waveguide 406 is sized and shaped to receive and direct light from the laser 420 along waveguide 406 to a focal point at the NFT 404.

The polarization rotator 440 includes a plurality of thin film layers and is configured to rotate an incident light beam by 90 degrees. Other features of the polarization rotator 440 may be the same or similar to those described above with respect to FIGS. 1-2. In FIG. 4, the polarization rotator 440 is attached to the front facet 428 (i.e., a light-emitting surface) of the laser 416. The polarization rotator 440 may be formed (i.e., grown) on the front facet 428 of the laser 416 by a number of deposition processes, each depositing an individual thin film layer of the polarization rotator 440.

A magnet 418 is shown attached to the submount 424 and positioned such that the magnetic flux lines of the magnet 418 are in the direction of light propagation through the polarization rotator 440. The magnet 418 is optional and may not be included in an implementation where the material of the phase shift region (e.g., the phase shift region 208 in FIG. 2) has a magnetic orientation that aligns with the direction of light propagation through the polarization rotator 440.

When the polarization rotator 440 is formed directly on the front facet 428 of the laser 416 (as shown in FIG. 4), the laser 416 may be bonded, during manufacturing, to the submount 424 while the submount 424 is still attached to other microelectronic components in a bar (e.g., a bar sliced from a semiconductor wafer). The bar can then be rotated and remounted, and the thin film layers of the polarization rotator 440 may be deposited according to one or more standard deposition processes including those described above with respect to FIG. 3. The thin film layers may be deposited, for example, on the front facet 428 of the laser 416.

Alternatively, the polarization rotator 440 may be formed separately (e.g., grown on a substrate rather than the front facet of the laser 416) and bonded, via solder or other attachment mechanism, to the front facet 428 of the laser 416, as in FIG. 4.

One advantage to growing the polarization rotator 440 on the laser 416, as in FIG. 4, is that a precise alignment may be achieved between the laser 416, the polarization rotator 440, and the waveguide 406. Such precise alignment is due in part to the fact that the polarization rotator 440 does not need to be aligned with the laser 416 (a step which may increase the overall error in the alignment process) because it is grown on the laser 416. Another advantage to the implementation of FIG. 4 is that the laser 416 and submount 424 may be safely exposed to higher temperatures than the slider 410. Therefore, the polarization rotator 440 is not, during manufacturing, limited by the temperature restrictions of the slider 410.

Figure 5:
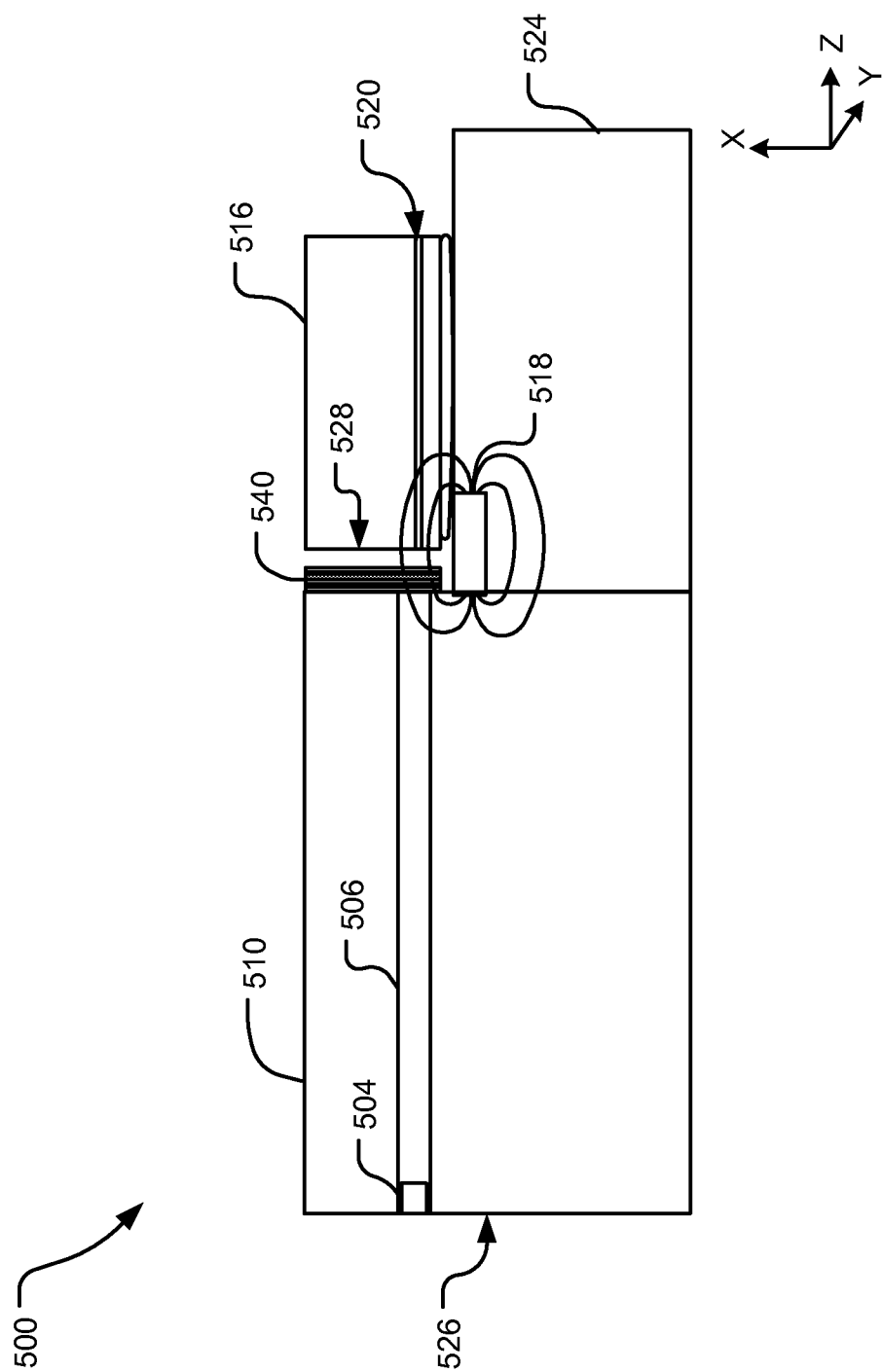
FIG. 5 illustrates a HAMR recording head including an example polarization rotator attached to a slider proximal to a light-emitting surface of a laser.

FIG. 5 illustrates a HAMR recording head 500 including an example polarization rotator 540 attached to a slider 510 proximal to a light-emitting surface 528 of a laser 516. The laser 516 is mounted on a submount 524 and configured to emit a light beam that travels along a laser active region 520 through the polarization rotator 540 and toward an ABS 526 proximal to a rotating storage medium (not shown). The slider 510 further includes a waveguide 506 oriented substantially perpendicular to the ABS 526. The waveguide 506 directs incident light to a focal point at an NFT 504, which further concentrates the energy of the light and directs it to a small spot on the surface of the rotating storage medium.

The polarization rotator 540 includes a plurality of thin film layers and is configured to rotate an incident light beam by 90 degrees. Other features of the polarization rotator 540 may be the same or similar to those described above with respect to FIGS. 1-2. A magnet 518 is shown attached to the submount 524 and positioned such that the magnetic flux lines of the magnet 518 are in the direction of light propagation through the polarization rotator 540. The magnet 518 is optional and may not be included in an implementation where the material of the phase shift region (e.g., the phase shift region 208 in FIG. 2) has a magnetic orientation that aligns with the direction of light propagation through the polarization rotator 540.

In the implementation of FIG. 5, the polarization rotator 540 is attached to the slider 510 adjacent to a light-receiving end of the waveguide 506. The polarization rotator 540 of FIG. 5 may be formed (i.e., grown) directly on the slider 510 using any of a number of standard deposition processes (e.g., sputtering, evaporation, ion beam deposition). In this implementation, the polarization rotator 540 may be formed at the wafer level during manufacturing (prior to slicing or dicing of the wafer into individual components).

In another implementation (not shown), a magneto-optical waveguide (not shown) is used in place of the polarization rotator 540. The waveguide functions to prevent divergence of the light beam as it travels between the laser 516 and the waveguide 506. In one such implementation, a Bragg grating is positioned between the front facet 528 of the laser 516 and the waveguide 506 to allow for enhanced polarization rotation at the resonant peak (e.g., the HAMR wavelength) in the photonic band gap of the grating.

Figure 6:
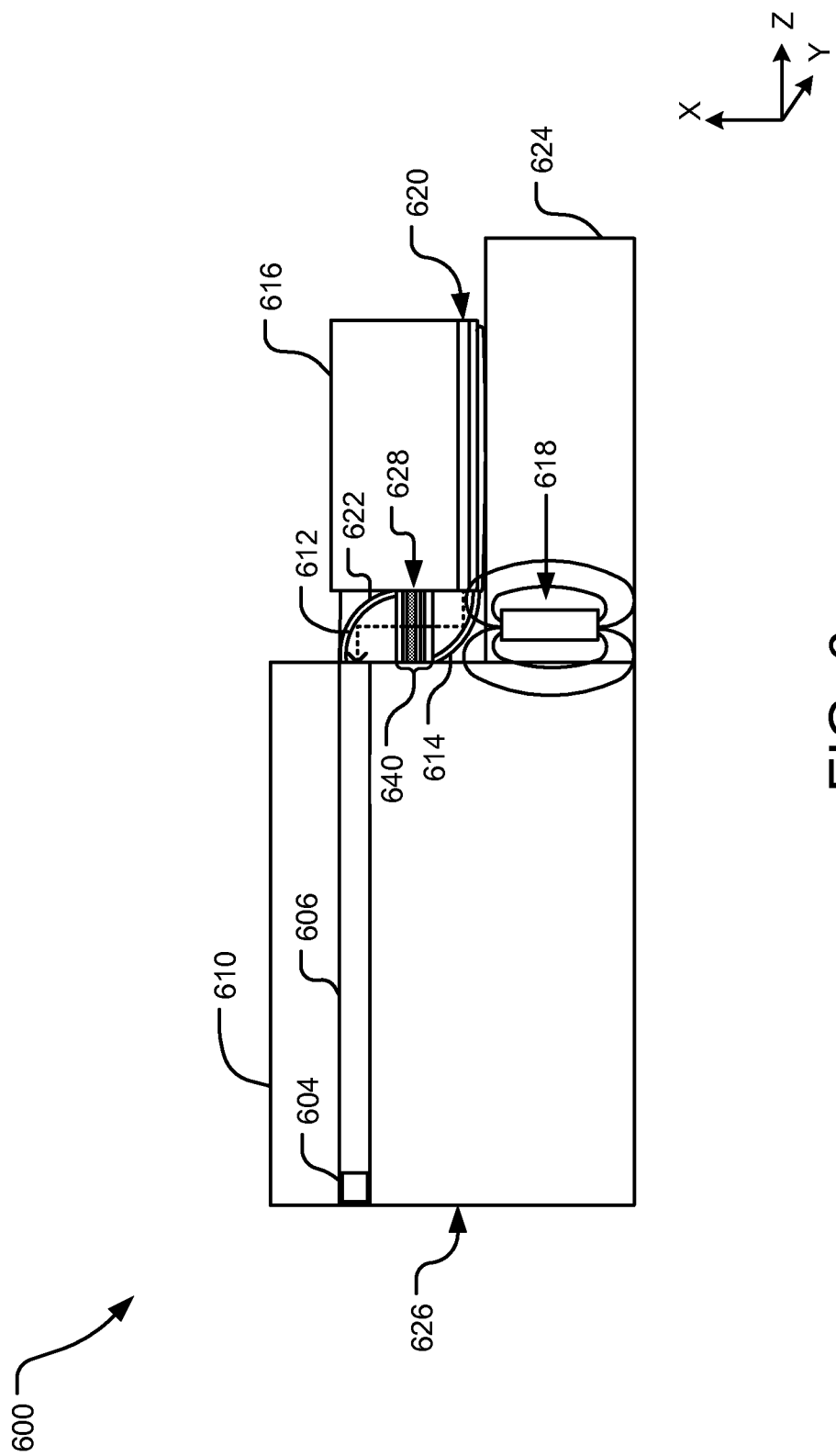
FIG. 6 illustrates a HAMR recording head including an example polarization rotator attached to a submount and positioned between a laser and a waveguide.

FIG. 6 illustrates a HAMR recording head 600 including an example polarization rotator 640 attached to a submount 624 and positioned between a laser 616 and a waveguide 606. The laser 616 is mounted on a submount 624 and configured to emit a light beam that travels along a laser active region 620, through the polarization rotator 640, and toward an ABS 626 proximal to a rotating storage medium (not shown). The slider 610 further includes a waveguide 606 oriented substantially perpendicular to the ABS 626. The waveguide 606 directs incident light to a focal point at an NFT 604, which further concentrates the energy of the light and directs it to a small spot on the surface of the rotating storage medium.

The polarization rotator 640 includes a plurality of thin film layers and is configured to rotate an incident light beam by 90 degrees. Other features of the polarization rotator 640 may be the same or similar to those described in FIGS. 1-2, above. In the implementation of FIG. 6, the polarization rotator 640 is positioned between the laser 616 and the slider 610 such that the thin film layers of the polarization rotator 640 are substantially parallel to the laser active region 620 and a longitudinal axis of the waveguide 606.

Light of laser 616 is directed along the laser active region 620 substantially parallel to the thin film layers of the polarization rotator 640. Prior to passing through the polarization rotator 640, the light is redirected by a first mirror 614 so that it passes through the thin film layers of the polarization rotator 640 in a direction substantially perpendicular to the thin film layers (as shown by a dotted line in the polarization rotator 640). Once passing through the thin film layers, a second mirror 622 redirects the light into the waveguide 606. The second mirror 606 thus redirects the light in a direction substantially parallel to the thin film layers of the polarization rotator 640. Consequently, the light enters the waveguide 606 in a direction substantially parallel to the longitudinal axis of the waveguide 606.

The mirrors 614 and 622 may be a variety of shapes and/or sizes. In one implementation, flat mirrors angled at 45 degrees to incident light beams are used. However, flat mirrors create a possibility of light divergence. Therefore, spherical and cylindrical mirrors (e.g., cylindrical with a longitudinal axis into the page in the negative y direction) are also contemplated.

In one implementation, the mirrors 614 and 622 are formed through sloped etching or milling with mirror material (e.g., gold or aluminum) deposited on the slopes. Mirror curvature may be implemented by controlling a milling or etching angle. After the mirrors are formed, dielectric material filling may be deposited and/or the mirrors may undergo chemical and mechanical polishing to effectively seal and flatten the surfaces of the mirrors for post integration processes. In one implementation, the mirrors implemented are smaller than the laser beam profile of the laser 616. In one such implementation, the laser beam profile of the laser 616 is less than or equal to approximately 10 square microns.

A magnet 618 is attached to the submount 624 and positioned such that magnetic flux lines of the magnet 618 are in the direction of light propagation through the polarization rotator 640. As in other implementations described herein, the magnet 618 is optional and may not be included in an implementation where the material of a phase shift region (e.g., the phase shift region 208 in FIG. 2) of the polarization rotator 640 has a magnetic orientation that aligns with the direction of light propagation.

Figure 7:
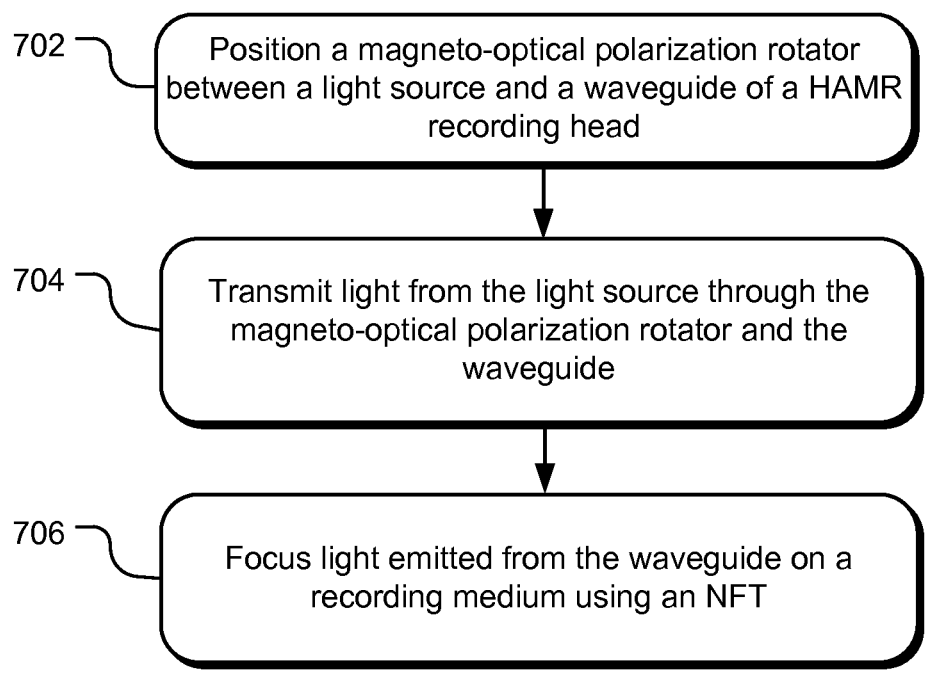
FIG. 7 illustrates operations for using an example polarization rotator.

FIG. 7 illustrates example operations for using a magneto-optical polarization rotator in a HAMR device. A positioning operation 702 positions a magneto-optical polarization rotator between a light source and a waveguide of a HAMR recording device. The positioning operation 702 may position the magneto-optical polarization rotator at any of a variety of functional orientations, which may be the same or different from other implementations disclosed herein.

In one implementation, the magneto-optical polarization rotator is grown on a substrate (e.g., independent of the submount, laser, and slider components) and positioned between the light source and the waveguide such that one or more thin film layers of the magneto-optical polarization rotator are substantially perpendicular to the direction of light propagation (see, e.g., FIG. 3). In another implementation, the magneto-optical polarization rotator is grown on a substrate and positioned between the light source and the waveguide such that one or more thin film layers of the magneto-optical polarization rotator are substantially parallel to the direction of light propagation (see, e.g., FIG. 6). In this implementation, two or more mirrors may be used to direct the light through the magneto-optical polarization rotator (e.g., in a direction perpendicular to the thin film layers) and into the waveguide. In another implementation, the magneto-optical polarization rotator is grown directly on a light-emitting surface of the laser (see, e.g., FIG. 4). In yet another implementation, the magneto-optical polarization rotator is grown on a light-receiving end of a slider (see, e.g., FIG. 5).

A transmission operation 704 transmits light from the light source through the magneto-optical polarization rotator and into the waveguide. As the light passes through the magneto-optical polarization rotator, it is rotated by 90 degrees before entering the waveguide. A focusing operation 706 focuses the light emitted from the waveguide on a recording medium using an NFT. The focused light locally heats the media to facilitate polarity switching of a data bit on the media.

The specific steps discussed with respect to each of the implementations disclosed herein are a matter of choice and may depend on the materials utilized or the design requirements of a given system. The steps discussed may be performed in any order, adding and omitting as desired, unless explicitly claimed otherwise of a specific order is inherently necessitated by the claim language. The above specification, examples, and data provide a complete description of the structure and use of exemplary implementations of the invention. Since many implementations of the invention can be made without departing from the spirit and scope of the invention, the invention resides in the claims hereinafter appended.

What is claimed is:

1. A heat-assisted magnetic recording (HAMR) head assembly comprising:
    a light source;
    a magneto-optical polarization rotator that couples light from the light source to a waveguide attached to a slider of the head assembly.

2. The HAMR head assembly of claim 1, wherein the magneto-optical polarization rotator has a magnetophotonic crystal structure including a number of thin film layers.

3. The HAMR head assembly of claim 1, wherein the magneto-optical polarization rotator has a photonic bandgap that transmits light of approximately 830 nanometers.

4. The HAMR head assembly of claim 1, wherein the magneto-optical polarization rotator further includes a quarterwave phase shift region.

5. The HAMR head assembly of claim 2, wherein a surface of the magneto-optical polarization rotator is bonded to a submount, the surface having an orientation substantially perpendicular to the thin film layers.

6. The HAMR head assembly of claim 2, wherein a surface of the magneto-optical polarization rotator is attached to a light-emitting surface of the light source and the thin film layers are substantially parallel to the light-emitting surface.

7. The HAMR head assembly of claim 2, wherein a surface of the magneto-optical polarization rotator is attached to the slider and the thin film layers are substantially perpendicular to a longitudinal axis of the waveguide.

8. The HAMR head assembly of claim 2, wherein the thin film layers are substantially parallel to a longitudinal axis of the waveguide and the HAMR recording device further includes:
    a first mirror to redirect light of the light source through the thin film layers in a direction substantially perpendicular to the thin film layers; and
    a second mirror to redirect the light into the waveguide.

9. A method comprising:
    positioning a magneto-optical polarization rotator between a light source and a waveguide on recording head, the magneto-optical polarization rotator having a magneto-photonic crystal structure including a number of thin film layers.

10. The method of claim 9, wherein the magneto-optical polarization rotator has a photonic bandgap that transmits light of approximately 830 nanometers.

11. The method of claim 9, wherein the magneto-optical polarization rotator further includes a quarterwave phase shift region.

12. The method of claim 9, further comprising:
    mounting the magneto-optical polarization rotator to a surface of a submount that is substantially perpendicular to the thin film layers.

13. The method of claim 9, further comprising:
    forming the magneto-optical polarization rotator on a light-emitting surface of the laser that is substantially parallel to the thin film layers.

14. The method of claim 9, further comprising:
    forming the magneto-optical polarization rotator on a slider wherein a surface of the magneto-optical polarization rotator is attached to a slider and the thin film layers are substantially perpendicular to a longitudinal axis of the waveguide.

15. The method of claim 9, wherein the thin film layers are substantially parallel to a longitudinal axis of the waveguide and the HAMR recording device further includes:
    a first mirror to redirect light of the light source through the thin film layers in a direction substantially perpendicular to the thin film layers; and
    a second mirror to redirect the light into the waveguide.

16. A storage device comprising:
    a magneto-optical polarization rotator that couples light from a light source to a waveguide attached to a slider of the storage device, the magneto-optical polarization rotator having a magnetophotonic crystal structure.

17. The storage device of claim 16, wherein the magnetophotonic crystal structure includes a quarterwave phase shift region.

18. The storage device of claim 16, wherein the magneto-optical polarization structure has a photonic bandgap that transmits light of approximately 830 nanometers.

19. The storage device of claim 16, wherein a light travel distance within the magneto-optical polarization structure is less than about 10 microns.

20. The method of claim 9, wherein the positioning operation further comprises positioning a magneto-optical polarization rotator between a light source and a waveguide on HAMR recording head.

* * * * *